United States Patent

McGarr

[15] 3,679,783
[45] July 25, 1972

[54] PROCESS FOR FORMING A THIN MICROPOROUS SHEET MATERIAL

[72] Inventor: John J. McGarr, Beverly, Mass.
[73] Assignee: USM Corporation, Boston, Mass.
[22] Filed: Oct. 16, 1969
[21] Appl. No.: 867,986

Related U.S. Application Data

[63] Continuation-in-part of Ser. No. 683,015, Nov. 14, 1967, abandoned, which is a continuation-in-part of Ser. No. 500,155, Oct. 21, 1965, abandoned.

[52] U.S. Cl. ..........................264/53, 260/2.5 AY, 264/41, 264/54, 264/DIG. 62
[51] Int. Cl. .......................................B29d 27/04
[58] Field of Search.....................264/41, 54, 53; 260/2.5 AY

[56] References Cited

UNITED STATES PATENTS

| | | | |
|---|---|---|---|
| 3,190,765 | 6/1965 | Yuan | 264/41 UX |
| 3,190,766 | 6/1965 | Yuan | 264/41 UX |
| 3,190,842 | 6/1965 | Ringwood et al. | 264/41 UX |
| 3,348,963 | 10/1967 | Fukushima et al. | 264/41 UX |
| 3,388,100 | 6/1968 | Thoma et al. | 264/41 UX |
| 3,403,046 | 9/1968 | Schwacke et al. | 264/41 UX |
| 3,413,184 | 11/1968 | Findlay et al. | 264/41 UX |
| 3,446,693 | 5/1969 | Alig et al. | 264/54 X |
| 3,473,957 | 10/1969 | Porrmann et al. | 264/41 UX |

*Primary Examiner*—Philip E. Anderson
*Attorney*—W. Bigelow Hall, Richard A. Wise and Benjamin C. Pollard

[57] ABSTRACT

A process for forming a microporous body having improved uniformity and permeability in which a normally solid or highly viscous polymeric reactive material is heated to bring it to a freely fluid state, a liquid having no or only very limited solvent or swelling action on the polymeric material is dispersed to form an emulsion with the polymeric material as the continuous phase, the polymeric material is reacted to tough, solid, resilient, film-forming condition, the emulsion is solidified and the liquid is removed leaving spaces constituting openings or pores in the solidified material. Where thin cross section bodies are desired, the emulsion is formed into a thin layer on a casting surface with a cover on the face of the emulsion opposite the casting surface, the cover remains in place during solidification of the emulsion, and is separated from the solidified emulsion before removal of the liquid.

19 Claims, 4 Drawing Figures

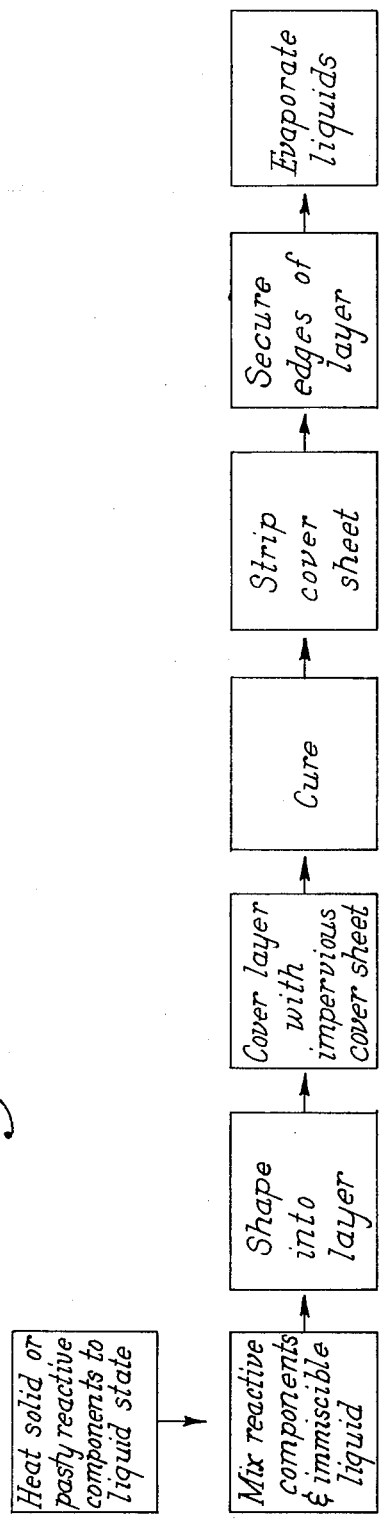

IMPROVED PROCESS FOR FORMING A THIN MICROPOROUS SHEET MATERIAL

This application is a continuation-in-part of the application of John J. McGarr entitled "Improvements in Processes for Forming a Porous Body of Porous Coating" Ser. No. 683,015, filed Nov. 14, 1967, which is a continuation-in-part of the application of the same inventor entitled "Composition and Processes for Making Microporous Bodies" Ser. No. 500,155, filed Oct. 21, 1965 and now both abandoned.

FIELD OF USE, BACKGROUND AND PRIOR ART RELATIVE TO THE INVENTION

This invention relates to an improved process for forming a microporous body.

In the parent applications there is disclosed a process in which there is formed an emulsion including controlled size droplets of liquid dispersed in a continuous phase of reactive polymeric material convertible through reaction to a tough, solidified, resilient film-forming condition, the liquid being selected to have no or only very limited solvent or swelling action on the polymeric material. The emulsion is formed into a body of desired shape and reacted to form a tough, solidified material with the droplets of non-solvent liquid entrapped in the solidified body. The non-solvent liquid is then removed leaving spaces constituting openings or pores in the solidified material.

In making such products, it was found that superior products were obtained using polymeric materials which are normally solid or pasty at room temperature. It was also found that the procedures involving use in addition to the non-solvent liquid of a true solvent for such polymeric materials to reduce them to a liquid capable of forming an emulsion was objectionable particularly because solidified bodies formed with emulsions containing true solvent for the polymeric material were in a somewhat swollen state and shrank in area on elimination of the true solvent to introduce a loss in permeability.

In the manufacture of thin layers of material by the process of the parent application, the surfaces were nonporous although the portions of the material below the surface had excellent connecting cell structure. Where permeability of the material was important, the nonporous surface was removed, generally by abrasion.

It is an object of the present invention to provide a process for forming a microporous body in which shrinkage and reduction in permeability of the product are avoided.

It is a further object of the present invention to provide a process in which a thin sheet material is formed having a surface which is permeable to water vapor as formed.

SUMMARY OF THE INVENTION

I have found that a superior, nonshrinking microporous body may be formed using a normally solid or pasty polymeric reactive material and heating it to bring it to freely fluid condition in which a non-solvent liquid may be rapidly and uniformly emulsified as controlled size droplets forming the disperse phase of the emulsion. The temperature during mixing of the reagents and forming the body for solidification to microporous state is controlled to provide the necessary fluidity and desirable reaction rate of the polymeric material while keeping the temperature below the boiling point of the non-solvent liquid. The body of material formed from the fluid emulsion quickly reaches a state which aids in retaining the non-solvent liquid droplets uniformly dispersed throughout the body.

I have also found that a thin microporous layer with improved uniformity and with high permeability at the surfaces as formed is produced by providing an impermeable cover on a freshly formed layer of the emulsion obtained by dispersing non-solvent liquid in the heat fluidified body of normally solid or pasty polymeric reactive material. The polymeric material is reacted to solidify it and thereafter the cover is separated from the solidified layer and the non-solvent liquid is removed.

Reference is made to the attached drawings in which:

FIG. 1 is a flow sheet of the present process;

FIG. 2 is a diagrammatic edge view of the formation of a liquid layer of the reactive mixture which will be solidified to form a microporous layer;

FIG. 3 is a diagrammatic edge view of the step of laying down an impervious cover sheet on the liquid layer; and FIG. 4 is a diagrammatic edge view of the step of removing the impervious cover sheet from the solidified layer formed by reaction of the mixture which has been laid down as a liquid.

DESCRIPTION OF THE PREFERRED EMBODIMENTS

Development of pores or passageways in a body of polymeric material in the process of the present invention involves the action of the dispersed droplets of non-solvent liquid in maintaining spaces within a continuous phase of hot liquefied polymeric material and the physical change in the polymeric material in the course of reaction to form a solidified body of higher molecular weight polymeric material. An initial result of molecular weight increase is an increase in viscosity followed by gelling and solidification of the polymeric material to hold the droplets of non-solvent liquid within the body of polymer. Thereafter increasing gel strength is developed through continued reaction of the polymeric material to resist collapse and sealing up of the opening left on removal of the liquid. The spaces occupied by the non-solvent liquid droplets are available after removal of the liquid to provide pores and passageways within the polymeric material. Additionally the reaction to give higher molecular weight, particularly when elements of cross linking are involved, results in a molecular change and resulting physical change which give a desirable form of open cell structure with through passages for transmission of gas or vapor.

Reactive materials for use in the present process are those for forming elastomeric polyurethane or polyurea reaction products and are selected on the basis of their ability to provide toughness, flexibility, hardness and other physical properties required in the final product. The reactive material may be a "one shot" mixture of an organic compound having at least two active hydrogens such as a polymeric polyol, e.g. polyalkylene ether polyol and/or polyester polyol, with a reactive compound having at least two reactive -NCO groups, e.g. a polyisocyanate. Alternatively, there may be used a prepolymer system in which an -NCO terminated reaction product of a polyol with excess polyisocyanate is combined with chain extenders which may be polyhydroxy or polyamine compounds.

It has been found important to use polyol material or prepolymers which at room temperature are solid or pasty. The term "pasty" refers to consistency which may be very high viscosity or may be partially solid which is capable of permanent deformation or even flow under substantial pressure, but which does not allow mixing with other reagents and with the non-solvent liquid component to form an emulsion with ordinary mixing and emulsifying equipment such as a high shear propeller type mixer. That is, many polyol or prepolymer materials which are sufficiently fluid for effective emulsion forming at room temperatures tend to form an initial reaction product which is too soft to hold the dispersed non-solvent liquid droplets until gelation occurs so that the droplets of non-solvent liquid are not held in position to form a uniform cellular structure.

Polyols useful in the "one shot" mixture or for forming the reactive prepolymer include substantially linear or only moderately branched polyether polyols, and substantially linear or moderately branched polyester polyols from the condensation of polybasic acids, e.g. adipic acid, sebacic acid, azelaic acid, dimerized linoleic acid and other aliphatic and aromatic dibasic acids with polyols such as butane diol, ethylene glycol, propylene glycol and the like. Castor oil is also a suitable polyol for making a prepolymer. Controlled portions of polyols or polybasic acids having more than two reactive OH or -COOH groups may be included in the compositions reactive to form polyester polyols to introduce moderate branching or cross linking.

The action of the non-solvent pore-forming liquid is primarily physical, that is, the non-solvent liquid is a readily removable space filler which is present as dispersed droplets until the coating at least partially solidifies around the droplets and is removed thereafter leaving open spaces and pores. Removal is effected without expansion of the solidified body. Suitable liquids may readily be selected by a chemist on the basis of the known physical properties of liquids. Any liquid having substantial non-solvency and non-reactivity with the polymeric material together with suitable volatility characteristics may be used. Normally liquid aliphatic hydrocarbons including petroleum hydrocarbon fractions, particularly those commercially available as mineral spirits, petroleum naphtha and kerosene which are largely or completely aliphatic in composition are generally preferred because of their low cost and satisfactory behavior in the composition, but other substantially inert organic liquids such as liquid alkyl ethers, e.g. amyl ether and dibutyl ether and liquid halogenated hydrocarbons, preferably halogenated aliphatic hydrocarbons such as chlorodecane, tetrachloroethylene and tetrachlorodifluoroethane may be used. To avoid premature evaporation from the body of emulsion so that it can serve its space filling function until it has solidified, the pore-forming liquid is chosen to have a boiling point above the selected mixing and reaction temperatures and should preferably have a boiling point of at least about 100° C. and preferably at least 130° C. to allow use of temperatures giving a desirable fluidity and rate of reaction of the polymeric material. On the other hand the liquid will be chosen with low enough boiling point for removal without heat injury to the solidified body or to a base with which it may be associated. Thus the liquid should ordinarily not contain substantial quantities of high boiling or low volatility components, and preferably at least 90 percent of the components should boil at temperatures below 232° C. It is to be understood that other means than evaporation, e.g. extraction may be used to remove high boiling or low volatility liquid and in such cases the upper limit of boiling point does not apply.

The extend of heating of the reactive polymeric material needed to bring the material to a suitably low viscosity, which may be of the order of 6,000 centipoises, for emulsion forming depends on the properties of the material. Higher melting point and higher molecular weight reactive polymeric materials require higher temperatures. Polymeric materials giving the desired improvement in retention of uniform droplet distribution of the emulsion in layer form call for heating to a temperature of at least about 50° C.

Dispersion of droplets of the pore-forming liquid in the heated liquid body of reactive polymeric material to form an emulsion in which the reactive polymeric material is the continuous phase, is effected by vigorous agitation during the course of addition of the pore-forming liquid to the body of polymeric material. Emulsifying agents are useful to aid in dispersing the liquid in the polymeric material and to stabilize the resulting emulsion. The selection of emulsifying agents is readily made by a chemist acquainted with the techniques of emulsion forming. Preferred emulsifying agents have included anionic and non-ionic surface active agents such as commercially available silicone emulsifiers, partial long chain fatty acid esters and the polyoxyalkylene derivatives of such esters, also sulfuric acid esters of long chain fatty alcohols, etc.

The amount of pore-forming liquid dispersed will vary with the desired porosity of the final product and may vary from as low as 25 parts of the liquid to 100 parts of the polymer up to as high as 300 parts of the liquid to 100 parts of the polymer material. It is preferred to use from about 60 parts to about 200 parts of liquid to 100 parts of the polymeric material. It is desirable that the mechanical conditions of dispersion of the liquid and the polymer be controlled to form very small droplet sizes of which the majority will be in the range of from about 0.0,001 to about 0.03 mm. in diameter.

Reaction of the polymeric material to higher molecular weight solid condition is brought about and controlled by the time and temperature conditions of bringing together of the reactive components and/or by the introduction of catalyst. In the one step process in which a polymeric polyol such as the polyether polyol or polyester polyol is reacted with a polyisocyanate, mixing and emulsification involves bringing together these materials together with the liquid to be dispersed and a catalyst, such as stannous octoate or lead naphthenate, effective to control the reaction rate. It will be understood that where reaction occurs at so fast a rate that it is difficult to complete the emulsion the prepolymer excessive increase in viscosity or solidification of the polymeric material takes place, the pore forming liquid may be emulsified in one of the reagents usually the polyether or polyester polyol before combination with the polyisocyanate.

In the two step process, an -NCO terminated prepolymer prepared from a polymeric polyol such as a hydroxyl terminated polyether or polyester and a polyisocyanate, the pore forming liquid, and chain extenders reactive with the prepolymer to give higher molecular weight materials are combined and emulsified with the prepolymer material forming the continuous phase. Chain extenders effective to increase the molecular weight of the prepolymer are compounds having two or more active hydrogen atoms such as p,p'-methylenedianiline, 4,4'-methylene-bis-(2,-chloroaniline), trimethylolpropane, m-phenylediamine, 1,4 butane diol and triethanolamine.

The emulsion is shaped into the desired form, such as a thin layer (see FIG. 2) promptly after formation and before the reaction has proceeded to a point where gelling of the composition through increase in molecular weight has occurred. Bodies of emulsions of any thickness or shape will solidify since no external reagent or treatment is required. Removal of the non-solvent liquid may be excessively time consuming from thick bodies; but a useful procedure is to cast thick slabs and divide them into thin sheets or other forms prior to removal of solvent. For thin sheets to be used without splitting, it is preferred to cast sheets which may range from very thin but continuous deposits, e.g. 8 mils wet thickness up to layers of as high as 100 mils wet thickness.

Surfaces on which the layer may be formed include casting surfaces such as glass or a release sheet, e.g. silicone or other treated paper from which the resultant film may be stripped after solidification, and porous bases such as woven or non-woven fibrous sheet material, paper, felt and so on, on which the deposited material will form a permanent coating.

For providing a porous film integrally united to a supporting layer, the emulsion may be spread directly on the supporting surface where the viscosity of the emulsion and the openness of the surface to which applied are such that penetration does not occur to an excessive degree. Thixotropic additives such as silica aerogel are useful in giving viscosity characteristics resisting excessive penetration. Preferably where a porous base is used, the base may be pre-wet with a quantity of the non-solvent liquid to resist absorption of non-solvent liquid from the applied emulsion.

The continuous phase of the emulsion is solidified by development of higher molecular weight through reaction of the polymeric material and when solidified entraps the droplets of liquid. At this point the solidified material may be separated from a glass plate or other impervious surface, if such is used, on which it is cast or may be removed from a mold, and the solidified articles subjected to further treatment to complete the cure. This further curing treatment, usually involving heating, insures removal by evaporation of the liquid of the entrapped droplets as the cure is completed. It is to be observed that owing to the physical state of the solidified partially cured polymeric material at the time of this further heating, the liquid of the droplets is able to escape without notable enlargement of the pores, this escape occurring through passageways in the continuous phase of the polymeric material. In fact, the thickness of a layer ordinarily decreases in the course of evaporation of the dispersed liquid droplets.

To form bodies, such as sheets, having improved uniformity the surface of the emulsion is covered to prevent loss of non-solvent liquid. To obtain good microporosity in the surface as formed, a substantially impervious protective cover is provided on the surface of the deposited emulsion layer opposite the casting surface as the layer is formed, or promptly after it is formed (see FIG. 3). The cover may be a release sheet such as a paper sheet carrying a non-adhesive deposit for example, of silicone, polytetrafluoroethylene, polychlorotrifluoro ethylene, wax, polyethylene or polypropylene or may be a non-adhesive supported or unsupported resin or elastomer sheet. It appears that at least some of the advantages obtainable from a cover sheet are obtainable by covering the free surface of a cast body of emulsion with a layer of non-solvent liquid which may be the same liquid as that dispersed through the emulsion or may be another immiscible, insoluble, non-reactive liquid.

In a further modification, a porous layer to which the solidified emulsion is to adhere permanently may be impregnated with non-solvent liquid and laid down on a layer of the liquid emulsion. In this relation, the non-solvent liquid in the porous sheet not only prevents undesired absorption of non-solvent liquid from the emulsion but also maintains an atmosphere of non-solvent liquid vapor above the emulsion to prevent loss of non-solvent liquid from the emulsion and at least partially to retain porosity at the surface of the solidified material.

The protective cover used in the manufacture of sheets is preferably flexible for convenience in handling and may be laid down on the emulsion layer by hand or by any of the known devices for laying a sheet down smoothly on a surface.

With the cover in place, the reaction of the polymeric progresses to gel and solidify the emulsion to a state in which the droplets of non-solvent liquid are held in a solid matrix.

The protective cover is removed from the layer when the layer has become a stable solid (see FIG. 4) and the non-solvent liquid is removed, preferably by evaporation although it may be removed by liquid extraction if desired. The layer so obtained is substantially uniform and is porous from surface to surface. That is, the layer does not have the non-porous surface layer obtained when the cover is not used.

The mechanism by which the cover gives this improvement is not fully understood. The cover does not serve as an envelope to retain expansion gas since there is neither development of gas nor expansion of the layer.

It is believed that the cover acts to control surface conditions to prevent loss of non-solvent liquid which might occur by syneresis or otherwise from portions of the layer adjacent the surfaces. An even more important factor appears to be the ability of the reactive polymeric material continuous phase to wet the cover preferentially to the non-solvent liquid so that the polymeric material is continuous adjacent the cover and the droplets of non-solvent liquid are aligned adjacent the surface but spaced from it by the continuous phase material. Surprisingly, the continuous phase opens at the points of closest approach of the droplets to the cover in the course of solidification so that excellent permeability at the surface is obtained without a tearing or cracking of the surface layer. Thus, the resulting sheet has excellent flex life as well as excellent permeability. Patentability of the process is not based on correctness of these explanations since a novel and important improvement is obtained through covering the emulsion layer.

The following examples are given to aid in understanding the invention but it is to be understood that the invention should not be restricted to the materials, proportions or procedure of the examples.

EXAMPLE I 68.7 grams (0.0,687 mols) of a normally solid at room temperature hydroxyl terminated polybutylene adipate having an hydroxyl number of 112, an acid number of 0.4 and a molecular weight of 1,000 which had been liquefied and degassed at 100° C., was mixed with 3.44 grams of a polyoxyalkylene ether having an OH number of 20 which is solid at 25° C. and the mixture was brought to a temperature of 80° C. 137 cc. of a liquid, paraffinic hydrocarbon mixture (boiling range 346° F. to 405° F.) was added slowly to the heated mixture of polybutylene adipate and polyoxyalkylene ether with vigorous agitation to form an emulsion with the hydrocarbon as the internal phase. 6.30 grams (0.0,699 mols) of 1,4 butane diol was added followed by 34.35 grams (0.1,373 mols) of p,p′-diphenylmethane diisocyanate which had been liquefied by heating to 60° C. After 4 ¼ minutes agitation, the resulting reactive emulsion was centrifuged to remove air bubbles and cast as a film 0.080 inch in thickness on a silicone treated glass plate. The film was held overnight in a covered chamber at 80° C., to gel the reaction product while impeding evaporation of the hydrocarbon. The cover was then removed and the film held 24 hours at 105° C. to cure it and to remove the emulsified liquid hydrocarbon by evaporation. The resulting product, after buffing to remove a thin skin, was a tough, snappy, microcellular film with a water vapor permeability of 1.94 gms./30 cm²/24 hours/64 mils. When this film was formed into a shoe vamp it survived over 578,000 flexes without cracking.

EXAMPLE II 130 grams (0.0,844 mols) of -NCO terminated prepolymer prepared by reaction of p,p′-diphenylmethane diisocyanate and hydroxyl terminated polybutylene adipate in a mol ratio of 2:1, the resulting prepolymer having a molecular weight of 1540, and being a solid at room temperature was liquefied and degassed at 100° C. and mixed with 3.9 grams of a polyoxyalkylene ether having an hydroxyl number of 20 which is a solid at 25° C. and the mixture was brought to a temperature of 70° C. 148 cc. of the liquid hydrocarbon mixture used in Example I was emulsified into the resulting hot mixture. 7.75 grams (0.0,860 mols) of 1,4 butane diol was added and mixed in. After 2 minutes agitation, the reactive emulsion was centrifuged to remove bubbles and cast as a film 0.080 inch in thickness. The film was held overnight in a covered chamber to gel the reaction product. The cover was removed and the film was held for 24 hours, at 105° C. to cure it and to evaporate off the liquid hydrocarbon. The product after buffing to remove a thin skin had a permeability of 1.09 grams/30 cm²/24 hours/50 mils. When the film was formed into a shoe vamp, the flex life was over 732,000 flexes.

EXAMPLE III 64.1 grams (0.0,799 mols) of a normally solid hydroxy terminated polyester derived from caprolactone and having an hydroxyl number of 139, an acid number of 0.4 and a molecular weight of 803, was liquefied and degassed at 100° C. and mixed with 3.2 grams of a polyoxyalkylene ether having an hydroxy number of 20 which was normally solid at 25° C. The heated mixture was brought to a temperature of 80° C. 112 cc. of the liquid hydrocarbon mixture employed in Example I was emulsified into the heated mixture. 7.35 grams (0.0,815 mols) of 1,4 butane diol was added. 40 grams (0.1,600 mols) of p,p′-diphenylmethane diisocyanate at a temperature of 60° C. was added to the emulsion with agitation. After 3 ½ minutes agitation, the reactive emulsion was centrifuged and then cast as a film. The film was held overnight at 80° C. in a covered chamber. The cover was removed and the film was held for 24 hours at 105° C. to cure it and remove the liquid hydrocarbon. The resulting product after buffing to remove a thin surface skin had a permeability of 1.54 gms./30 cm²/24 hours/55 mils. The vamp flex life was over 816,000 flexes.

EXAMPLE IV 160 grams (0.01,169 mols) of a normally solid, -NCO terminated prepolymer prepared by reaction of p,p′-diphenylmethane diisocyanate and hydroxyl terminated polyester derived from caprolactone in the mole ratio of 2:1, the resulting prepolymer having a molecular weight of 1370, was liquefied and degassed at 100° C. and mixed with 1.60 grams of a polyoxyalkylene ether having an hydroxyl number of 20. The mixture was brought to a temperature of 70° C. 172 cc. of the liquid hydrocarbon used in Example I was emulsified into the heated prepolymer. 10.72 grams (0.1,192 mols) of 1,4 butane diol was added and thoroughly mixed in. After 2 minutes agitation, the reactive mixture was centrifuged to remove bubbles and cast as a film. The film was held overnight at 80° C. in a covered chamber to gel the reaction product. The cover was then removed and the film was held for 24 hours at 105° C. to cure it and to remove the liquid hydrocarbon. The resulting product after buffing to remove a thin surface skin had a permeability of 0.66 grams/30 cm²/24 hours/44 mils. The vamp flex life was over 763,000 flexes.

EXAMPLE V 200 grams (0.205 mols) of polytetramethylene ether glycol, having an hydroxyl number of 115 and a molecular weight of 975 was liquefied and degassed at 100° C. and mixed with 10 grams of a polyoxyalkylene ether having an hydroxyl number of 20. The mixture was brought to a temperature of 50° C. 325 cc. of the liquid hydrocarbon mixture used in Example I was emulsified into the heated mixture of glycol and polyoxyalkylene ether. 102.5 grams (0.410 mols) of p,p'-diphenylmethane diisocyanate at a temperature of 60° C. was added. After 9 minutes agitation 2.5 cc of a 0.1 percent hydrocarbon solution of dibutyl tin dilaurate was added followed forty minutes later by 18.55 grams (0.206 mols) of 1,4 butane diol. After 1 minute agitation, the resulting reactive emulsion was centrifuged to remove bubbles and then cast as a film. The film was held overnight at 80° C. in a covered chamber to gel the film. The cover was then removed and the film was held for 24 hours at 105° C. to cure it and to remove the liquid hydrocarbon. The resulting product after buffing had a permeability of 0.64 grams/30 cm.²/24 hours/59 mils. The vamp flex life was over 408,000 flexes.

EXAMPLE VI 160 grams (0.1,036 mols) of a normally very viscous -NCO terminated prepolymer prepared by the reaction of p,p'-diphenylmethane diisocyanate and polytetramethylene ether glycol in a mol ratio of 2:1, the resulting prepolymer having a molecular weight of 1545, was heated to render it freely fluid and degassed at 100° C., and mixed with 1.60 grams of a polyoxyalkylene ether having an hydroxyl number of 20. The mixture was brought to a temperature of 50° C. 160 cc. of the liquid hydrocarbon mixture used in Example I was emulsified into the heated fluid prepolymer. 0.71 grams (0.1,077 mols) of 1,4 butane diol was added. After 3 minutes agitation, the reactive mixture was centrifuged to remove bubbles and then cast as a film on a glass plate. The film was held overnight at 80° C. in a covered chamber. The cover was then removed and the film was held for 24 hours at 105° C. to cure it and to remove the hydrocarbon mixture. The resulting product after buffing had a water vapor permeability of 0.30 grams/30 cm.²/24 hours/58 mils. The vamp flex life was over 816,000 flexes.

EXAMPLE VII 100 grams of -NCO terminated prepolymer prepared by reaction of p,p'-diphenylmethane diisocyanate and hydroxyl terminated polybutylene adipate in a mol ratio of 2:1, and being solid at room temperature was liquefied and degassed at 100° C. and mixed with 3.15 grams of a silicone surfactant and 0.62 grams of a commercial dispersion of carbon black. The mixture was brought to 70° C., and 147 cc. of the liquid hydrocarbon mixture in Example I was emulsified into the resulting hot mixture. 4.24 grams of 1,4 butane diol was added and mixed in. The reactive emulsion was cast as a film about 0.090 inch in thickness on a release sheet. One-half of the film was covered immediately with a release sheet coated with polytetrafluoroethylene. The cast material was held overnight at 85° C., the cover stripped off and the sheet material cured 22 hours at 90° C.

Samples were cut from portions of the sheet which had been covered with the release material and from portions of the sheet which had not been covered. In each case the sheet material, after curing, was tough and flexible. The samples were subjected to standard water vapor permeability tests and it was found that the sheet material which had been covered had a water vapor permeability of 0.88 gms./30 cm²/24 hours/64 mils and the water vapor permeability of the material which had not been covered was only 0.26 gms./30 cm²/24 hours/64 mils.

EXAMPLE VIII 60.2 gm. (0.0,411 mols) of a prepolymer prepared by the reaction of p,p'-diphenylmethane diisocyanate and polybutylene adipate in a mol ratio of 2:1, the resulting prepolymer having a molecular weight of 1466, and 1.81 gm. of a polyoxyalkylene ether were heated together in a 100° C. bath. 88 cc. of n-butyl ether was emulsified into the prepolymer. 3.34 gm. (0.0,370 mols) of 1,4 butane diol was added. After 3 minutes agitation the reactive emulsion was poured into a dish, covered with a layer of n-butyl ether, and stored in a covered chamber overnight at 60° C. The gelled product was then removed from the dish and cured for 24 hours at 90° C. A center slice of the cured microcellular material had a water vapor permeability of 1.07 gm./30 cm²/24 hours/60 mils.

EXAMPLE IX 34.8 gm. (0.0,348 mols) of polybutylene adipate, molecular weight 1000, and 1.75 gm. of a polyoxyalkylene ether were heated together in a 60° C. bath. 56 cc. of 1-chlorodecane was added slowly, with agitation, to form an emulsion with the 1-chlorodecane as the internal phase. 3.21 gm (0.0,356 mols) of 1,4 butane diol was added, followed by 17.45 gm. (0.0,698 mols) of p,p'-diphenylmethane diisocyanate. After 15 minutes agitation the reactive emulsion was centrifuged to remove air bubbles and cast as a film on a glass plate. A sheet of teflon-coated glass cloth was immediately laid on the surface of the film to prevent skin formation and a gasketed cover then placed on the glass plate to prevent evaporation of the 1-chlorodecane. This assembly was heated overnight at 60° C. to gel the polymer. The cover and the cloth were then removed and the film cured for 24 hours at 95° C. The resulting product, without buffing, was a microcellular film with a water vapor permeability of 1.43 gm./30 cm.²/24 hours/37 mils.

Having thus described my invention, what I claim as new and desire to secure by Letters Patent of the United States is:

1. In the process of forming a microporous solidified body comprising the steps of casting a water-free emulsion of fine droplets of a volatile organic liquid as the internal phase in a continuous phase comprising reactive material convertible through reaction to solidified, resilient, film-forming condition, said reactive material comprising a mixture of an organic compound providing at least two reactive -NCO groups per molecule and an organic compound having at least two active hydrogens per molecule for reaction with said -NCO groups, said organic liquid having a boiling point of at least about 100° C. and at least 90 percent boiling below 232° C., being substantially non-solvent for and non-reactive with said reactive material, being immiscible in said continuous phase and being present in amount from about 60 percent to about 300 percent by weight based on the weight of the reactive material, reacting said material at a temperature below the boiling point of said liquid so that the liquid never boils to cause the emulsion to gel and solidify with said droplets held in the solidified material and removing said liquid without expanding the solidified material leaving pores and discontinuities in the solidified material to constitute passageways for air and vapor, the improvement which comprises employing as said continuous phase a mixture of reactive components which is substantially free from solvents for said reactive components, said mixture including at least one substantially linear or moderately branched polymer polyol from the group consisting of polyalkyleneether polyols, polyester polyols from reaction and condensation of polybasic acids and polyols and polyester polyols from caprolactones which is solid or pasty at room temperature and a polyisocyanate and said mixture has a consistency at room temperature which interferes with emulsifying said immiscible liquid, heating any reactive component which is solid or pasty at room temperature to bring it to freely fluid state and mixing said reactive components and dispersing said immiscible liquid to form an emulsion while said solid or pasty at room temperature component is in heated state, whereby the consistency of the emulsion after casting is improved due to the presence of said polymeric component to aid in retaining the dispersed droplets uniformly distributed through the layer.

2. The process of forming a microporous sheet as defined in claim 1 in which said polymeric reactive component is heated to a temperature of at least about 50° C. to bring it to a viscosity suitably low for emulsion formation, in which said liquid is an aliphatic hydrocarbon having a boiling point above the emulsifying and reaction temperature and in which said emulsion is cast as a layer.

3. The process of forming a microporous sheet as defined in claim 2 in which said layer of emulsion is held at elevated temperature after casting to complete the reaction between said reactive components.

4. The process of forming a microporous solidified body as defined in claim 1 in which said body is a thin, microporous layer and said process includes the steps of depositing said emulsion in a thin layer on a supporting surface, providing means to prevent loss of non-solvent liquid from said emulsion on the face of said layer opposite said supporting surface before substantial reaction of said components, thereafter reacting said components to bring the layer to a solid state with said means in place and without substantial expansion of said layer, removing said means from said face after solidification of said reaction mixture and thereafter removing said non-solvent liquid from said layer.

5. The process of forming a microporous solidified body as defined in claim 4 in which said means to prevent loss of non-solvent liquid is an impervious cover in contact with said face of said layer.

6. The process of forming a microporous solidified body as defined in claim 5 in which said impervious cover is a flexible sheet material.

7. The process of forming a microporous solidified body as defined in claim 4 in which said means to prevent loss of non-solvent liquid is a layer of an organic liquid having a boiling point of at least about 100° C. and being substantially non-solvent for and non-reactive with said reactive material and being immiscible in said continuous phase.

8. The process of forming a microporous solidified body as defined in claim 7 in which the liquid of said non-solvent liquid layer is the same as the liquid of said fine droplets.

9. The process of forming a microporous solidified body as defined in claim 4 in which said means to prevent loss of non-solvent liquid is a porous layer impregnated with an organic liquid having a boiling point of at least about 100° C., said liquid being substantially non-solvent for and non-reactive with said reactive material and being immiscible in said continuous phase.

10. The process of forming a microporous solidified body as defined in claim 6 in which said polymeric reactive component is heated to a temperature of at least about 50° C. to bring it to a viscosity suitably low for emulsion formation and in which said liquid is an aliphatic hydrocarbon having a boiling point above the emulsifying and reaction temperature.

11. The process of forming a microporous solidified body as defined in claim 10 in which said layer of emulsion is held at elevated temperature after casting to complete the reaction between said reactive components.

12. In the process of forming a microporous solidified body comprising the steps of casting a water-free emulsion of fine droplets of a volatile organic liquid as the internal phase in a continuous phase comprising reactive material convertible through reaction to solidified, resilient, film-forming condition, said reactive material comprising a mixture of an organic compound providing at least two reactive -NCO groups per molecule and an organic compound having at least two active hydrogens per molecule for reaction with said -NCO groups, said organic liquid having a boiling point of at least about 100° C. and at least 90 percent boiling below 232° C., being substantially non-solvent for and non-reactive with said reactive material, being immiscible in said continuous phase and being present in amount from about 60 percent to about 300 percent by weight based on the weight of the reactive material, reacting said material at a temperature below the boiling point of said liquid so that the liquid never boils to cause the emulsion to gel and solidify with said droplets held in the solidified material and removing said liquid without expanding the solidified material leaving pores and discontinuities in the solidified material to constitute passageways for air and vapor, the improvement which comprises employing as said continuous phase a mixture of reactive components which is substantially free from solvents for said reactive components, said reaction mixture including as reactive components at least one -NCO terminated prepolymer from reaction of a polyisocyanate with a polymeric polyol from the group consisting of polyalkyleneether polyols, polyester polyols from reaction and condensation of polybasic acids and polyols and polyester polyols from caprolactones which are solid or pasty at room temperature and a chain extender having at least two active hydrogens per molecule for combination with the -NCO groups of said prepolymer to form a higher molecular weight, tough, strong film-forming material and said mixture has a consistency at room temperature which interferes with emulsifying said immiscible liquid, heating any reactive component which is solid or pasty at room temperature to bring it to freely fluid state and mixing said reactive components and dispersing said immiscible liquid to form an emulsion while said solid or pasty at room temperature component is in heated state, whereby the consistency of the emulsion after casting is improved due to the presence of said polymeric component to aid in retaining the dispersed droplets uniformly distributed through the layer.

13. The process of forming a microporous sheet as defined in claim 12 in which said chain extender is at least one member of the group consisting of p,p'-methylenedianiline, 4,4'-methylene - bis - (2,-chloroaniline), trimethylol propane, m-phenylenediamine, 1,4 butane diol and triethanolamine.

14. The process of forming a microporous sheet as defined in claim 13 in which said polymeric reactive component is heated to a temperature of at least about 50° C. to bring it to a viscosity suitably low for emulsion formation, in which said liquid is an aliphatic hydrocarbon having a boiling point above the emulsifying and reaction temperature and in which said emulsion is cast as a layer.

15. The process of forming a microporous solidified body as defined in claim 12 in which said body is a thin, microporous layer and said process includes the steps of depositing said emulsion in a thin layer on a supporting surface, providing means to prevent loss of non-solvent liquid from said emulsion on the face of said layer opposite said supporting surface before substantial 16. The process of forming a microporous solidified body as defined in claim 12 in which said body is a thin, microporous layer and said process includes the steps of depositing said emulsion in a thin layer on a supporting surface, providing means to prevent loss of non-solvent liquid from said emulsion on the face of said layer opposite said supporting surface before substantial reaction of said components, thereafter reacting said components to bring the layer to a solid state with said means in place and without substantial expansion of said layer, removing said means from said face after solidification of said reaction mixture and thereafter removing said non-solvent liquid from said layer.

17. The process of forming a microporous solidified body as defined in claim 16 in which said means to prevent loss of non-solvent liquid is an impervious flexible sheet material in contact with said face of said layer.

18. The process of forming a microporous solidified body as defined in claim 15 in which said means to prevent loss of non-solvent liquid is a layer of an organic liquid having a boiling point of at least about 100° C. and being substantially non-solvent for and non-reactive with said reactive material and being immiscible in said continuous phase.

19. The process of forming a microporous solidified body as defined in claim 16 in which said means to prevent loss of non-solvent liquid is a porous layer impregnated with an organic liquid having a boiling point of at least about 100° C., said liquid being substantially non-solvent for and non-reactive with said reactive material and being immiscible in said continuous phase.

* * * * *